US008864153B2

(12) United States Patent
Luttinen et al.

(10) Patent No.: US 8,864,153 B2
(45) Date of Patent: Oct. 21, 2014

(54) AUTOMOTIVE REAR SUSPENSION SUBASSEMBLY

(71) Applicant: GM Global Technology Operations LLC, Detroit, MI (US)

(72) Inventors: James L. Luttinen, Brighton, MI (US); Timothy J. Schabel, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/794,926

(22) Filed: Mar. 12, 2013

(65) Prior Publication Data

US 2014/0265201 A1 Sep. 18, 2014

(51) Int. Cl.
 B62D 7/16 (2006.01)
 B62D 7/18 (2006.01)
 B62D 7/20 (2006.01)
 B62D 21/11 (2006.01)

(52) U.S. Cl.
 CPC ........................................ B62D 7/18 (2013.01)
 USPC ............ 280/93.507; 280/124.109; 280/93.51; 280/93.512

(58) Field of Classification Search
 CPC .......... B60G 2204/15; B60G 2206/50; B60G 2206/604; B62D 3/12; B62D 7/16; B62D 7/163; B62D 7/166; B62D 7/18; B62D 21/11
 USPC .............. 180/311, 312; 280/124.109, 93.507, 280/93.508, 93.51, 93.512, 93.514, 93.515
 See application file for complete search history.

(56) References Cited

U.S. PATENT DOCUMENTS

| 1,886,963 | A | * | 11/1932 | Lundelius et al. | ..... | 280/124.136 |
|---|---|---|---|---|---|---|
| 2,043,228 | A | * | 6/1936 | Best | ....................... | 280/124.128 |
| 2,044,809 | A | * | 6/1936 | Rabe | ...................... | 280/124.153 |
| 2,080,969 | A | * | 5/1937 | MacBeth | ............... | 280/124.139 |
| 2,094,824 | A | * | 10/1937 | Sanford | ................. | 280/124.136 |
| 2,095,566 | A | * | 10/1937 | Lundelius et al. | ........ | 280/93.507 |
| 2,113,094 | A | * | 4/1938 | Paton | ..................... | 280/124.136 |
| 2,144,162 | A | * | 1/1939 | Leighton | .................. | 280/93.508 |
| 2,153,233 | A | * | 4/1939 | Best | ....................... | 280/124.153 |
| 2,153,271 | A | * | 4/1939 | Paton | ..................... | 280/124.141 |
| 2,154,558 | A | * | 4/1939 | Beemer | ..................... | 280/93.507 |
| 2,173,667 | A | * | 9/1939 | Slack | ........................ | 280/86.754 |
| 2,231,338 | A | * | 2/1941 | Kolbe | .................... | 280/124.103 |
| 2,297,591 | A | * | 9/1942 | Urich | .................... | 280/124.133 |
| 2,483,974 | A | * | 10/1949 | Hicks et al. | ............ | 280/124.107 |
| 2,588,544 | A | * | 3/1952 | Langer | ..................... | 280/93.508 |
| 2,652,263 | A | * | 9/1953 | Varnum | .................. | 280/124.139 |
| 2,737,398 | A | * | 3/1956 | Mohr | ..................... | 280/124.128 |
| 2,766,051 | A | * | 10/1956 | Chapman | ................. | 280/93.507 |
| 2,814,499 | A | * | 11/1957 | Schlechter | .............. | 280/93.507 |
| 2,948,546 | A | * | 8/1960 | Fabere et al. | .......... | 280/124.113 |
| 3,047,307 | A | * | 7/1962 | Beyerstedt | ............ | 280/124.113 |

(Continued)

*Primary Examiner* — Faye M Fleming
*Assistant Examiner* — Laura Freedman
(74) *Attorney, Agent, or Firm* — Quinn Law Group, PLLC

(57) ABSTRACT

An automotive rear-suspension subassembly includes a rear-suspension frame, a first and second independent suspension, and a steering actuator coupled with each independent suspension through a bellcrank. The frame includes a front cross-member, a first side-rail, and a second side-rail, and defines a first side and a second side. The actuator is disposed on the first side of the frame, and the bellcrank extends across the frame from the first side to the second side. Each independent suspension is respectively configured to support a vehicle wheel, and includes a respective knuckle. Actuation of the steering actuator urges each respective knuckle to rotate.

18 Claims, 1 Drawing Sheet

(56) References Cited

U.S. PATENT DOCUMENTS

| | | | |
|---|---|---|---|
| 3,204,978 A * | 9/1965 | Panhard | 280/124.14 |
| 3,765,698 A * | 10/1973 | Burrell | 280/124.17 |
| 3,936,071 A * | 2/1976 | Ricketts et al. | 280/93.5 |
| 3,948,336 A * | 4/1976 | DeFusco et al. | 180/254 |
| 5,165,179 A * | 11/1992 | Schoeninger | 33/600 |
| 6,334,623 B1 * | 1/2002 | Kinouchi et al. | 280/93.513 |
| 6,672,603 B2 * | 1/2004 | Lee | 280/124.109 |
| 7,976,037 B2 * | 7/2011 | Yoshida et al. | 280/124.109 |

\* cited by examiner

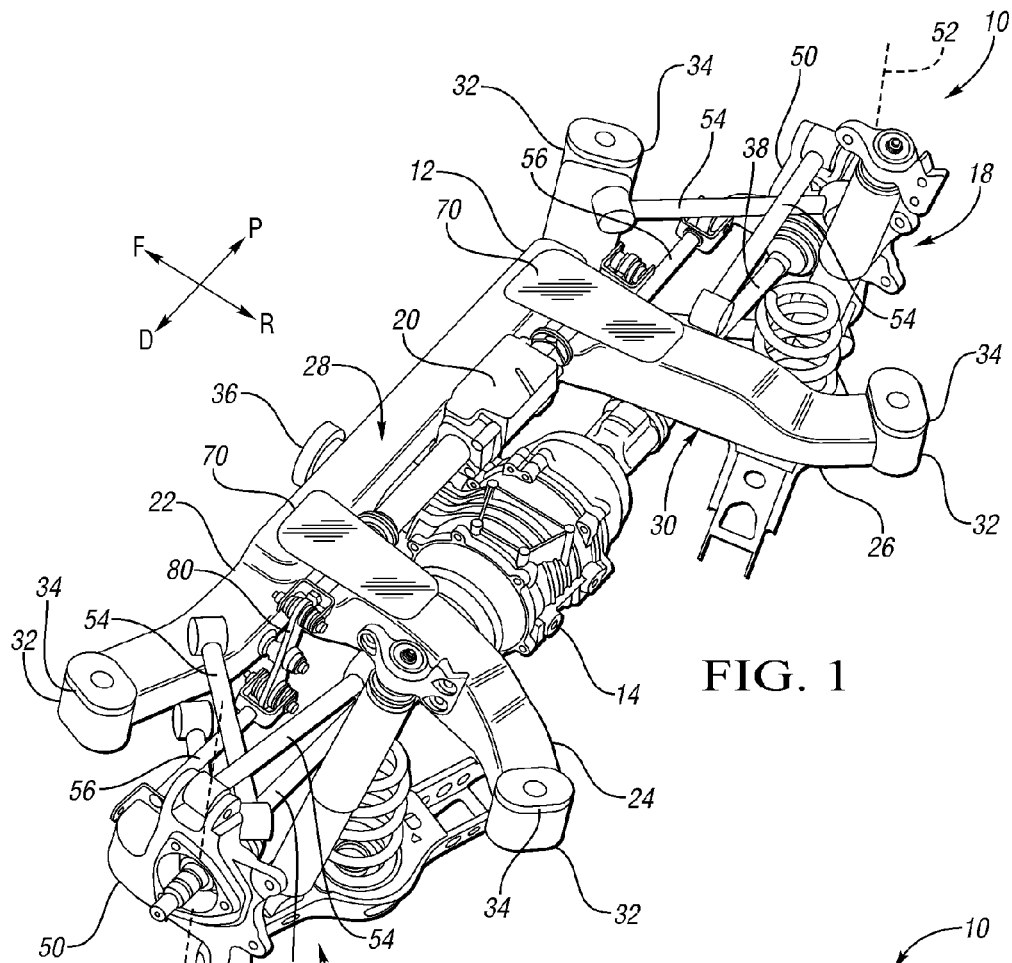
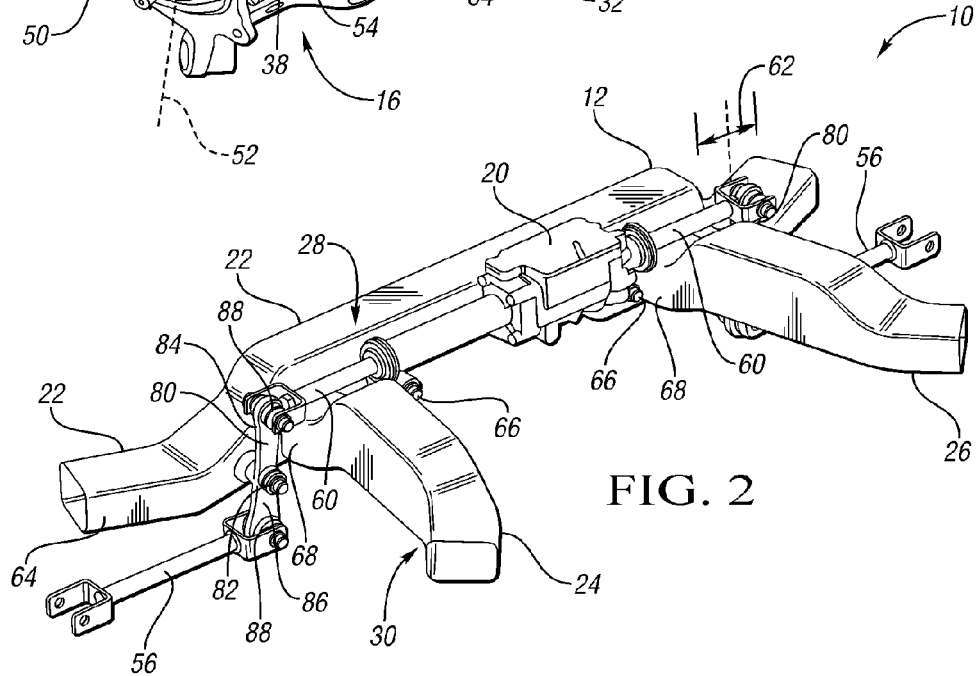

AUTOMOTIVE REAR SUSPENSION SUBASSEMBLY

TECHNICAL FIELD

The present invention relates to a rear suspension assembly for an automotive vehicle that includes a controllable steering actuator.

BACKGROUND

A frame is a structural component of a vehicle, such as an automobile or an aircraft, that uses a discrete, separate structure within a larger body-on-frame or unit body to carry certain components, such as the engine, drivetrain, or suspension (collectively referred to as a subassembly). The frame/subassembly is generally bolted and/or welded to the vehicle as a complete unit, which greatly simplifies the final vehicle assembly process. When bolted, it is sometimes equipped with rubber bushings or springs to dampen vibration.

One purpose of using a suspension subassembly is to isolate vibration and harshness from the rest of the body. For example, in an automobile with its powertrain contained in a suspension subassembly, forces generated by the engine and transmission can be damped enough that they will not disturb passengers. As a natural development from a car with a full chassis, separate front and rear suspension subassemblies are used in modern vehicles to reduce the overall weight, cost, and assembly complexity.

In certain situations, it may be desirable to include a steering actuator with the rear suspension subassembly to allow the rear wheels to be actively steered. In this manner, the vehicle may intelligently understeer/oversteer to promote overall stability and maneuverability.

SUMMARY

An automotive rear-suspension assembly includes a suspension frame, a first and a second independent suspension, a steering actuator, and a differential. The frame may include a front cross-member, a first side-rail, a second side-rail, and a rear cross-member. The front cross-member may be affixed to, and may be generally transverse to each of the first side-rail and the second side-rail. The cross-member, first side-rail, and second side-rail may collectively separate an upper side of the frame from a lower side of the frame. In one configuration, the upper side is configured to directly abut the vehicle.

Each of the first independent suspension and the second independent suspension may be respectively coupled with the frame. The first independent suspension may include a first steering knuckle translatable along a first axis and also rotatable about that axis. The second independent suspension may similarly include a second knuckle that is translatable and rotatable about a second axis. Each steering knuckle may be respectively configured to support a vehicle wheel.

A differential may be disposed between the first side-rail and the second side-rail, and potentially on the lower side of the frame. The differential may include a torque input shaft, a first torque output shaft in mechanical communication with the first independent suspension, and a second torque output shaft in mechanical communication with the second independent suspension. Each of the first and second torque output shafts may extend entirely on the lower side of the frame.

The steering actuator may be disposed on the cross-member, between the first side-rail and the second side-rail. Actuation of the steering actuator may urge each of the first knuckle and second knuckle to rotate.

The subassembly may further include a first and second bellcrank, each being pivotably secured to the cross-member. The first bellcrank may be configured to couple the steering actuator with the first knuckle, and the second bellcrank may be configured to couple the steering actuator with the second knuckle. Each of the first bellcrank and the second bellcrank may respectively extend across the frame from the upper side to the lower side of the frame. The first bellcrank may be coupled with the first knuckle through a first tie-rod, and the second bellcrank may be coupled with the second knuckle through a second tie-rod.

Each bellcrank may be pivotably secured to the frame through a respective bushing that extends from the front cross-member. Additionally, if the bellcrank is removed, each of the first and second tie-rods may be capable of being directly secured to the respective bushing to restrain rotation of the knuckle.

In one configuration, each of the first and second side-rails may be formed around a portion of the steering actuator, such that the respective portions of the actuator are disposed on the upper side of the frame. In this case, a first closeout panel may extend between the first side-rail and the front cross-member, and a second closeout panel may extend between the second side-rail and the front cross-member. The first closeout panel, the first side-rail, and the cross-member may cooperate to surround the first portion of the steering actuator, and the second closeout panel, the second side-rail, and the cross-member may cooperate to surround the second portion of the steering actuator.

In one configuration, neither the first bellcrank nor the second bellcrank are disposed between the first side-rail and the second side-rail. Conversely, in other configurations, one or both bellcranks may be disposed between the respective side-rails.

Additionally, in one configuration, the steering actuator may be capable of rotating each of the first and second knuckles about its respective axis by a maximum of 10 degrees in either direction.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic isometric view of a portion of a rear-suspension subassembly.

FIG. 2 is a schematic isometric view of a portion of a rear-suspension subassembly.

DETAILED DESCRIPTION

Referring to the drawings, wherein like reference numerals are used to identify like or identical components in the various views, FIG. 1 schematically illustrates a portion of a rear-suspension assembly 10 that includes a frame 12, a differential 14, a first and a second independent suspension 16, 18, and a steering actuator 20. In one configuration, the rear-suspension assembly 10 may be a subassembly that may be separately assembled, and subsequently affixed to the underside of an automotive vehicle (i.e., rearward of the passenger compartment), to support the rear vehicle wheels. The rear-suspension assembly 10 may be installed according to the directional key provided in FIG. 1, where "F" represents the front of the vehicle, "R" represents the rear of the vehicle, "D" represents the driver's side, and "P" represents the passenger side. In other configurations, the rear-suspension assembly 10 may be partially or wholly integrated within the frame/chassis of the vehicle.

The rear-suspension frame 12 may include a front cross-member 22, a first side-rail 24 and a second side-rail 26. In one configuration, each cross-member/side-rail 22, 24, 26 may be formed using a tubular and/or box-beam type construction. Alternatively, other cross-sectional designs may be employed, such as I-beam construction or C-channel construction. A rear cross-member (not shown) may be included with the frame 12 to form a closed, box-type frame that may provide enhanced structural stiffness. Each side-rail 24, 26 may be secured to the front cross-member 22 and rear cross-member, for example, through one or more welds or bolts (preferably welds).

The front cross-member 22, the first side-rail 24 and the second side-rail 26 may collectively separate an upper side 28 of the frame 12 from a lower side 30 of the frame (i.e., where the lower side 30 is opposite the upper side 28). During installation into the vehicle the upper side 28 may directly abut the vehicle chassis, while the lower side 30 may generally face away from the vehicle (i.e., in a downward direction and/or toward the road surface). When the assembly 10 is a self-contained subassembly 10, the frame 12 may include a plurality of vehicle mounts 32, each respectively including an isolation bushing 34, to secure the subassembly 10 to the vehicle. As may be appreciated, the isolation bushings 34 may be formed from an elastomeric material that may serve to dampen any vibration or road noise from being transmitted to the remainder of the vehicle.

The differential 14 may be coupled with the rear-suspension frame 12 and may include a torque input shaft 36, and one or more torque output shafts 38. The input shaft 36 may be coupled with a transmission and engine of the vehicle, such as using a tubular drive shaft. Likewise, each output shaft 38 may be coupled with a respective vehicle wheel (potentially through one or more intermediate components). As known in the art, the differential 14 may include one or more gears, clutches, or other torque transmitting devices that may be configured to controllably transfer a received torque at the input shaft 36 to an output torque at one or both of the output shafts 38.

The differential 14 may generally be secured to the frame 12 such that it is generally disposed (i.e., more that 50%) on the lower, (i.e., downward facing) side 30 of the rear-suspension frame 12. The differential 14 may be rigidly secured to the frame 12 through one or more bolts, welds, or brackets. In one configuration, when secured in place, a portion of the differential 14 and/or torque input shaft 36 may extend across/under a portion of the front cross-member 22.

In addition to the differential, 14, each of the respective first and second independent suspensions 16, 18 may be mounted on the rear-suspension frame 12. Each independent suspension 16, 18 may include a steering knuckle 50 that may ultimately receive a wheel, and may be designed to allow the wheel to move in a constrained manner (generally along a substantially vertical/transverse axis 52) relative to the rear-suspension frame 12.

FIG. 1 generally illustrates each independent suspension 16, 18 as a 5-Link suspension, where multiple stabilizing members 54 may support a respective steering knuckle 50, and allow the knuckle 50 to move in a predefined manner. As known in the art a steering knuckle 50 is a component that generally serves as a mounting location to receive and support a vehicle wheel. It should be appreciated that, while a 5-Link suspension has been provided for illustrative purposes, the present technology may similarly be used with other Multi-Link suspensions, Linked-H suspensions, Short-Long Arm (SLA) suspensions, Double-Wishbone suspensions, MacPherson Strut suspensions, or other similar independent suspension designs.

Each suspension 16, 18 may include a tie-rod 56 that is coupled with the respective steering knuckle 50 at a location apart from the axis 52. In one configuration, a force applied through the tie-rod 56 may impart a moment/torque to the knuckle 50, which may urge the knuckle 50 to rotate about the axis 52. If the tie-rod 56 is coupled to a controllable actuator, each respective steering knuckle 50 (and corresponding wheel) may be articulated in response to a provided actuation signal. If the tie-rod 56 is instead rigidly coupled to the frame 12, the tie-rod 56 may then resist each respective steering knuckle 50 (and corresponding wheel) from articulating.

As mentioned above, and more clearly illustrated in FIG. 2, in one configuration, the rear-suspension assembly 10 may include a steering actuator 20 that includes a steering linkage 60. The steering actuator 20 may be a linear actuator that is configured to respond to a provided actuation command by linearly translating the steering linkage 60 across a finite range 62 via a provided force. In one configuration, the steering actuator 20 may be a rack and pinion-style steering actuator that uses an electric motor to drive the pinion gear.

The steering actuator 20 may abut an inward/rearward facing surface 64 of the front cross-member 22, and may be disposed substantially between the first side-rail 24 and the second side-rail 26. The steering actuator 20 may be rigidly secured to the cross-member 22 using a plurality of bolts 66 (and/or bolts with associated rubber bushings). In one configuration, a portion of the steering actuator 20 and/or steering linkage 60 may extend across/over the upper side 28 of each of the first and second side-rails 24, 26. In this manner, the steering actuator 20 and/or steering linkage 60 may be disposed on an opposite side of the side-rails 24, 26 from the differential 14 and/or the torque output shafts 38.

In the configuration shown in FIGS. 1 and 2, a portion 68 of each side-rail 24, 26 may be formed around the steering linkage 60, and a rigid, close-out panel 70 may be affixed to the respective side-rails 24, 26 to enhance the rigidity of the frame 12. The close-out panel 70 may extend between each side-rail 24, 26 and the front cross-member 22, and may be bolted or welded in place. In this configuration, the close-out panel 70 may be disposed on an opposite side of the steering linkage 60 from the respective side-rails 24, 26, such that the front cross-member 22, the respective side-rail 24, 26 and the close-out panel 70 cooperate to surround the steering linkage 60.

As best illustrated in FIG. 2, in one configuration, the steering linkage 60 may be coupled to each tie-rod 56 using a pivotable bellcrank 80. The bellcrank 80 may extend generally across the frame 12, from the upper side 28 to the lower side 30, and may be pivotably secured to the frame 12 at a pivot point 82. In one configuration, the pivot point 82 may be defined by a rotatable bushing or rotatable bearing that extends from the inward facing surface 64 of the front cross-member 22. The bellcrank 80 may generally include an input portion 84 and an output portion 86. The input portion 84 may be defined by the portion of the bellcrank 80 that extends between the pivot point 82 (i.e. the rotatable bushing) and the steering linkage 60. Likewise, the output portion 86 may be defined by the portion of the bellcrank 80 that extends between the pivot point 82 (i.e. the rotatable bushing) and the tie-rod 56.

In one embodiment, the pivotable bellcrank 80 may be coupled with the steering linkage 60 and the tie-rod 56 using a rotatable bushing 88 at each end. Each rotatable bushing 88 may be made of a polymeric material, and may provide for unencumbered relative rotation about one axis. Additionally, the bushing 88 may have sufficient elasticity/compliance to permit minor (i.e., less than 5 degree) rotation about other axes. Such a design may minimize lash that would otherwise be present if ball joints were used. In one configuration, as generally illustrated in FIG. 2, neither pivotable bellcrank 80 is disposed between the first side-rail 24 and the second side-rail 26. In other configurations, one or both of the bellcranks 80 may be disposed between the first side-rail 24 and the second side-rail 26.

Movement of the steering linkage 60 by the actuator 20 may be transferred through the bellcrank 80 to the tie-rod 56, and may urge the steering knuckle 50 to articulate about the axis 52. As may be appreciated, the bellcrank 80 may act as a lever/simple machine to either increase the steering force applied to the tie-rod 56, or increase the total displacement distance. By altering the relative lengths of the input portion 84 and output portion 86, the force/distance multiplication may be altered. In one configuration, the actuator 20 and bellcrank 80 may be selected such that the steering knuckle 50 has a maximum angular rotation of approximately 5-10 degrees in either direction (i.e., a maximum total rotation of approximately 10-20 degrees). This compares to a front suspension that can typically rotate approximately 30-40 degrees in either direction. In this configuration, the present rear-steering assembly may generally operate as a secondary steering means to assist a (primary) front-steering assembly.

The present design provides an auto manufacturer with a versatile way to provide additional functionality to a vehicle without any significant structural modifications. If an end customer does not wish to have rear-steer capabilities, the actuator 20 and bellcrank 80 may be unbolted and removed, and the tie-rod 56 may be directly fastened to the frame 12 (e.g. at the front cross-member 22). For example, in one configuration, the tie-rod 56 may be attached to the frame 12 by securing it directly to the pivot point 82 previously used to attach the bellcrank 80. In another configuration, a bracket or fixture may be used to secure the tie-rod 56 to the front cross-member 22.

As a further benefit, by coupling the actuator 20 to the steering knuckles 50 with the intermediate bellcrank 80, the actuator 20 may be further removed from any environmental hazards that may exist in the lower rear portion of the vehicle. In the illustrated configuration, the actuator 20 is generally shielded from inadvertent impacts (e.g., from stones, road debris, parking blocks, or curbs) from below by the differential 14, from the front by the front cross-member 22, from the sides by the side-rails 24, 26, and from the rear (likely) by other vehicle components (e.g., the spare tire tub). This is different from a hypothetical direct actuation system (i.e., omitting the bellcrank 80) that would necessarily be positioned lower in the subassembly 10, and likely further rearward due to the physical obstruction presented by the differential 14. Additionally, by moving the actuator 20 upward, via the bellcrank 80, it ensures that the bolt-on steering actuation system would not interfere with components of a vehicle exhaust system (i.e., tailpipe or muffler) which are typically hung below the differential output shafts 38.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. An automotive rear-suspension assembly comprising:
a frame including a cross-member, a first side rail, and a second side-rail, the cross-member being affixed to, and generally transverse to, each of the first and the second side-rails, and wherein the frame defines a first side and a second side that is opposite the first side;
a knuckle rotatably supported on the frame, the knuckle configured to support a vehicle wheel;
a bellcrank pivotably supported on the cross-member and generally extending from the first side of the frame to the second side of the frame;
a steering actuator disposed on the cross-member and in mechanical communication with the knuckle through the bellcrank;
a first closeout panel extending between the first side-rail and the cross-member;
a second closeout panel extending between the second side-rail and the cross-member;
wherein each of the first side-rail and second side-rail are respectively formed around the steering actuator;
wherein the first closeout panel, first side-rail, and cross-member cooperate to surround a first portion of the steering actuator;
wherein the second closeout panel, the second side-rail, and the cross-member cooperate to surround a second portion of the steering actuator; and
wherein an actuation of the steering actuator is configured to rotate the knuckle.

2. The assembly of claim 1, further comprising a differential disposed between the first side-rail and the second side-rail, the differential including a torque input shaft configured to receive a torque;
a torque output shaft in mechanical communication with the knuckle; and
wherein the torque output shaft extends across the first side-rail, and is disposed adjacent to the second side of the frame.

3. The assembly of claim 2, wherein the bellcrank is coupled with the knuckle through a tie-rod; and
wherein the tie-rod is capable of being directly secured to the frame.

4. The assembly of claim 1, further comprising a closeout panel extending between the side-rail and the cross-member; and
wherein the closeout panel, side-rail, and cross-member cooperate to surround a portion of the steering actuator.

5. The assembly of claim 1, wherein the steering actuator is capable of rotating the knuckle by a maximum of 20 degrees.

6. An automotive rear-suspension assembly comprising:
a frame including a cross-member, a first side-rail, and a second side-rail, the cross-member being affixed to, and generally transverse to, each of the first side-rail and the second side-rail;
a first independent suspension and a second independent suspension, each suspension being respectively coupled to the frame, the first independent suspension including a first knuckle that is rotatable about a first axis, the second independent suspension including a second knuckle that is rotatable about a second axis, and wherein each of the first and second knuckles are configured to support a respective vehicle wheel;
a first bellcrank and a second bellcrank, each bellcrank being pivotably secured to the cross-member;
a steering actuator disposed on the cross-member between the first side-rail and the second side-rail, the steering actuator configured to urge each of the first knuckle and second knuckle to rotate about its respective axis;
a first closeout panel extending between the first side-rail and the cross-member;
a second closeout panel extending between the second side-rail and the cross-member;
wherein each of the first side-rail and second side-rail are respectively formed around the steering actuator;
wherein the first closeout panel, first side-rail, and cross-member cooperate to surround a first portion of the steering actuator;
wherein the second closeout panel, the second side-rail, and the cross-member cooperate to surround a second portion of the steering actuator; and
wherein the steering actuator is in mechanical communication with the first knuckle through the first bellcrank, and is in mechanical communication with the second knuckle through the second bellcrank.

7. The assembly of claim 6, wherein the frame defines a first side and a second side, the second side being opposite the first side and generally configured to face a surface of a road; and
wherein the first bellcrank and the second bellcrank each respectively extend across the frame from the first side to the second side.

8. The assembly of claim 7, further comprising a differential disposed between the first side-rail and the second side-rail, the differential including a torque input shaft, a first torque output shaft in mechanical communication with the first independent suspension, and a second torque output shaft in mechanical communication with the second independent suspension; and
wherein the first torque output shaft extends across the first side-rail, the second torque output shaft extends across the second side-rail, and wherein each of the first and second torque output shafts are disposed adjacent to the second side of the frame.

9. The assembly of claim 7, wherein the first bellcrank is coupled with the first knuckle through a first tie-rod, and wherein the second bellcrank is coupled with the second knuckle through a second tie-rod;
wherein each of the first and second tie-rods is respectively capable of being directly secured to the frame.

10. The assembly of claim 6, wherein the steering actuator is capable of rotating each of the first and second knuckles about its respective axis by a maximum of 20 degrees.

11. The assembly of claim 6, wherein the frame further includes a plurality of vehicle mounts configured to secure the frame to a vehicle; and
wherein each vehicle mount includes an isolation bushing.

12. An automotive rear-suspension assembly comprising:
a frame including a cross-member, a first side-rail, and a second side-rail, the cross-member being affixed to, and generally transverse to, each of the first side-rail and the second side-rail, wherein the cross-member, the first side-rail, and the second side-rail collectively separate an upper side of the frame from a lower side of the frame;
a first independent suspension and a second independent suspension, each suspension being respectively coupled to the frame, the first independent suspension including a first knuckle that is rotatable about a first axis, the second independent suspension including a second knuckle that is rotatable about a second axis, and wherein each of the first and second knuckles are configured to support a respective vehicle wheel;
a steering actuator disposed on the cross-member between the first side-rail and the second side-rail, the steering actuator configured to urge each of the first knuckle and second knuckle to rotate about its respective axis;
a first bellcrank and a second bellcrank, each bellcrank being pivotably secured to the cross-member, and wherein the first bellcrank is configured to couple the steering actuator to the first knuckle, and the second bellcrank is configured to couple the steering actuator to the second knuckle; and
a differential disposed between the first side-rail and the second side-rail and on the lower side of the frame, the differential including a torque input shaft, a first torque output shaft in mechanical communication with the first independent suspension, a second torque output shaft in mechanical communication with the second independent suspension, and wherein each of the first and second torque output shafts are disposed on the lower side of the frame;
wherein the first side-rail is formed around a first portion of the steering actuator;
wherein the second side-rail is formed around a second portion of the steering actuator; and
wherein each of the first and second portions of the steering actuator are disposed on the upper side of the frame.

13. The assembly of claim 12, wherein each of the first bellcrank and the second bellcrank respectively extend across the frame from the upper side to the lower side.

14. The assembly of claim 12, wherein the first bellcrank is coupled with the first knuckle through a first tie-rod, and wherein the second bellcrank is coupled with the second knuckle through a second tie-rod.

15. The assembly of claim 14, wherein the first bellcrank is pivotably secured to the cross-member through a first bushing;
wherein the second bellcrank is pivotably secured to the cross-member through a second bushing;
wherein the first tie-rod is capable of being directly secured to the first bushing; and
wherein the second tie-rod is capable of being directly secured to the second bushing.

16. The assembly of claim 12, further comprising:
a first closeout panel extending between the first side-rail and the cross-member;
a second closeout panel extending between the second side-rail and the cross-member;
wherein the first closeout panel, the first side-rail, and the cross-member cooperate to surround the first portion of the steering actuator; and
wherein the second closeout panel, the second side-rail, and the cross-member cooperate to surround the second portion of the steering actuator.

17. The assembly of claim 12, wherein neither the first bellcrank nor the second bellcrank are disposed between the first side-rail and the second side-rail.

18. The assembly of claim 12, wherein the steering actuator is capable of rotating each of the first and second knuckles about its respective axis by a maximum of 10 degrees in either direction.

* * * * *